United States Patent [19]

Searle et al.

[11] Patent Number: 4,625,211

[45] Date of Patent: Nov. 25, 1986

[54] ADAPTIVE ANTENNA ARRAY

[75] Inventors: Jeffrey G. Searle, Stanstead Mountfitchet; Christopher R. Ward, Bishops Stortford, both of United Kingdom

[73] Assignee: Standard Telephone and Cables plc, London, England

[21] Appl. No.: 617,248

[22] Filed: Jun. 4, 1984

[30] Foreign Application Priority Data

Jun. 18, 1983 [GB] United Kingdom ................. 8316658

[51] Int. Cl.[4] .......................... H01Q 3/24; G01S 3/16

[52] U.S. Cl. .................................... 342/374; 342/378

[58] Field of Search ........................ 343/374, 378–384, 343/18 E; 455/283–284, 303

[56] References Cited

U.S. PATENT DOCUMENTS 2,575,340 11/1951 Goldstein ........................... 343/374

3,876,947 4/1975 Giraudon ........................... 343/383

4,005,426 1/1977 White ................................. 343/378

FOREIGN PATENT DOCUMENTS 59-44104 3/1984 Japan .................................. 343/374

1599035 9/1981 United Kingdom .

*Primary Examiner*—Theodore M. Blum

*Assistant Examiner*—Bernarr Earl Gregory

*Attorney, Agent, or Firm*—Kerkam, Stowell, Kondracki & Clarke

[57] ABSTRACT

A multiple output, power inversion adaptive antenna array comprises a number of antenna elements A1-An feeding a cascade beam former structure having groups of decorrelation stages $D1_1$-$D1_{n-1}$, $D2_1$-$D2_{n-2}$ etc. The outputs of the first stage in each group are scanned sequentially until the wanted signal is predominant, as determined by a wanted signal recognition CONTROL, at which time scanning of the switch S is halted.

1 Claim, 1 Drawing Figure

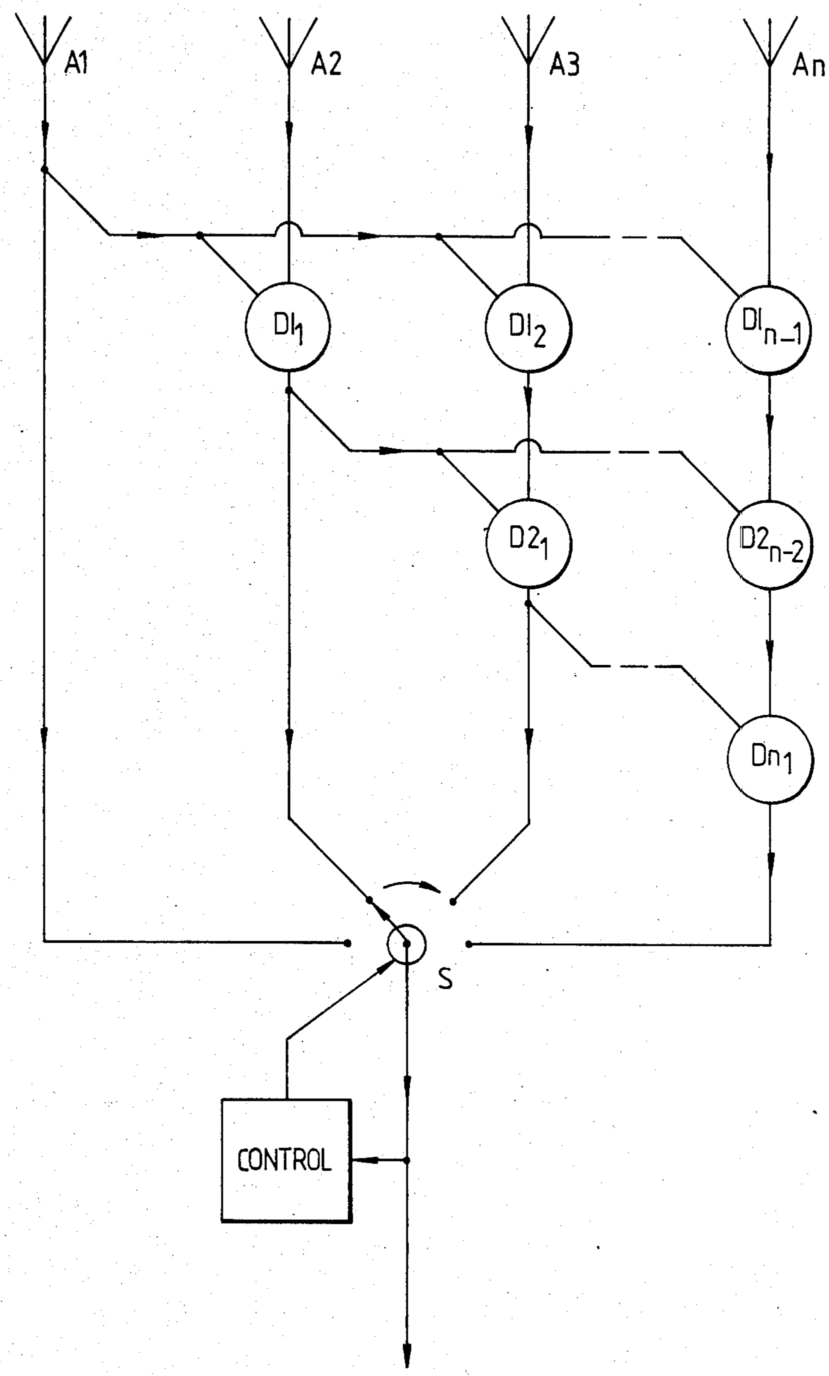
A1
A2
A3
An
DI1
DI2
DIn-1
D21
D2n-2
Dn1
S
CONTROL

ADAPTIVE ANTENNA ARRAY

This invention relates to a power inversion adaptive antenna array.

Such arrays are employed in signal receiving systems where the wanted signal is received in conjunction with other unwanted signals of greater strength emanating from sources having different bearings with respect to the wanted signal source. Such unwanted signals, e.g. interference or jamming signals, can be reduced or eliminated with respect to the wanted signal by combining the signals received from the antenna elements of a multi-element array with the aid of weighting networks so that the unwanted signals are effectively nulled by power inversion of the unwanted signals.

However, using a multi-element array in this manner it is possible that the weaker, wanted signal may be inadvertently nulled. The problem lies in the selection of the optimum number of array elements to feed the beam forming networks so that pattern nulls are formed only for the unwanted signals. Utilising too few elements will result in cancellation of too few signal sources whilst too many elements will cause cancellation not only of the unwanted signals but also of the wanted signal.

According to the present invention there is provided a multiple output, power inversion adaptive antenna array comprising a plurality of antenna elements connected by decorrelation stages arranged in groups each group including one less decorrelation stage than the preceding group and the first group including one less stage than the number of antenna elements, each stage of the first group being connected to receive as a main signal a signal from a different one of the antenna elements and as an auxiliary signal the signal from the remaining element and to provide an output signal and each decorrelation stage of each subsequent group being connected to receive as a main signal an output signal from a respective decorrelation stage of the preceding group and as an auxiliary signal the remaining output signal from the preceding group and to provide an output signal whereby each group has one predetermined decorrelation stage the output signal of which is decorrelated with respect to one or more of all except one of the antenna element input signals, characterised in that the array includes scanning means whereby the outputs of the predetermined one stage of each group are scanned in succession beginning with that of the first group and control means responsive to the detection of scanned output signals having predetermined criteria to control the scanning means and to halt scanning of the outputs when said predetermined criteria are attained.

An embodiment of the invention will now be described with reference to the accompanying drawing which illustrates in block schematic form only the main components of an adaptive array.

A number of antenna elements A1-An are provided. The output from element A1 is decorrelated from each of the output of the remaining elements A2-An by a first group of decorrelation stages $D1_1$-$D1_{n-1}$, to each of which the output of element A1 is the auxiliary signal input and the output of a respective one of elements A2-An is the main signal input. A second group of decorrelation stages $D2_{\pm D2n\text{-}2}$ receives as auxiliary signal inputs the output from stage $D1_1$ of the first group, and as their main signal inputs the outputs from the stages $D1_2$-$D1_{n-1}$. Succeeding groups of stages are provided, the last group having in fact only one stage $Dn_1$. The succeeding groups of decorrelation stages thereby form a cascaded beam forming structure. The output from the first antenna element A1 and the outputs from the first stage in each group of stages, i.e. $D1_1$, $D2_1$ . . . $Dn_1$ are also connected to a scanning switch S, whereby the outputs may be scanned in turn from A1 to $Dn_1$. The output of switch S is the output from the array. The switch output is also applied to a wanted signal recognition processor CONTROL wherein the decorrelated signals are monitored to determine when the wanted signal attains predominance. The control then acts to halt the scanning operation. Initially the output from element A1 alone is monitored. If the wanted signal is dominated by unwanted signals then the switch S selects the next output, which is that from stage $D1_1$. This signal is now decorrelated from the signal at A1, utilising only antenna elements A1 and A2, and results in the strongest unwanted signal being cancelled by forming a pattern null in the appropriate direction. If the wanted signal is still predominated by a second unwanted signal then switch S selects the output from stage $D2_1$. Now a second null is formed by the inclusion of antenna element A3, and the signal at $DZ_1$ is decorrelated from the two strongest unwanted signals. This process is continued, with the control processor, effectively adapting the size of the array until the wanted signal predominates. At this point scanning is halted. The array thus utilises only sufficient elements to null only signals stronger than the wanted signal. This method of adaptively limiting the number of array elements actually used in any given reception conditions is particularly attractive as it requires little a-priori knowledge of the wanted signal format except its recognition under conditions of favourable signal to noise ratio. By using the cascade beam former structure the technique of adaptively limiting, and hence optimising, the number of array elements is intrinsically available and by virtue of the cascade beamformer the response time is comparable with the fastest currently known other techniques whilst and the same time being relatively non-complex in construction. The invention is especially suitable for small arrays, e.g. having less than 10 elements.

The decorrelation stages are of known construction and in themselves do not form part of the inventive concept. Typically they may be of the type disclosed in British Pat. No. 1599035.

We claim:

1. A multiple output, power inversion adaptive antenna array comprising a plurality of antenna elements connected by decorrelation stages arranged in groups each group including one less decorrelation stage than the preceding group and the first group including one less stage than the number of antenna elements, each stage of the first group being connected to receive as a main signal a signal from a different one of the antenna elements and as an auxiliary signal the signal from the remaining element and to provide an output signal and each decorrelation stage of each subsequent group being connected to receive as a main signal an output signal from a respective decorrelation stage of the preceding group and as an auxiliary signal the remaining output signal from the preceding group and to provide an output signal whereby each group has one predetermined decorrelation stage the output signal of which is decorrelated with respect to one or more of all except one of the antenna element input signals, the array including scanning means whereby the outputs of the predetermined one stage of each group are scanned in succession beginning with that of the first group and control means responsive to the detection of scanned output signals having predetermined criteria to control the scanning means and to halt scanning of the outputs when said predetermined criteria are attained.

* * * * *